(12) United States Patent
Rogalski, Jr. et al.

(10) Patent No.: US 7,746,509 B2
(45) Date of Patent: Jun. 29, 2010

(54) METHOD FOR REMOVING DEFECTS IN SCANNED IMAGES

(75) Inventors: Eugene A. Rogalski, Jr., Penfield, NY (US); Roger Triplett, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 860 days.

(21) Appl. No.: 11/641,731

(22) Filed: Dec. 20, 2006

(65) Prior Publication Data

US 2008/0151319 A1    Jun. 26, 2008

(51) Int. Cl.
*H04N 1/04* (2006.01)

(52) U.S. Cl. .................. 358/463; 358/464; 358/446; 358/474

(58) Field of Classification Search .......... 358/463, 358/464, 446, 474, 496, 497, 498
See application file for complete search history.

(56) References Cited

U.S. PATENT DOCUMENTS

| | | | |
|---|---|---|---|
| 4,967,233 A | 10/1990 | Buchar et al. | |
| 5,280,368 A | 1/1994 | Fullerton | |
| 5,404,232 A | 4/1995 | Selby | |
| 5,621,217 A | 4/1997 | Seachman et al. | |
| 6,038,038 A | 3/2000 | Selby et al. | |
| 6,567,188 B1 | 5/2003 | Thompson et al. | |
| 6,594,401 B1 * | 7/2003 | Metcalfe et al. | 382/275 |
| 6,822,763 B2 | 11/2004 | Morris et al. | |
| 7,620,360 B2 * | 11/2009 | Heydinger et al. | 399/374 |

* cited by examiner

*Primary Examiner*—Houshang Safaipour
(74) *Attorney, Agent, or Firm*—Pillsbury Winthrop Shaw Pittman LLP (57) ABSTRACT

A method for removing show-through defects in scanned document images is provided by adjusting the scanner's image sensor calibration gain in the area of a drive roll gap. The method will also compensate for drive roll contamination. The invention uses a modified calibration scheme in conjunction with a document transmission sensor in the document handler to measure radiant energy transmitted through the document, i.e., transmission. The scanner adjusts the calibration gain factors to simulate a uniform background with knowledge of the gap and the input document's transmission thus a uniform scanner response is determined and presented to the image processing. A device for carrying out the method is also provided.

16 Claims, 8 Drawing Sheets

METHOD FOR REMOVING DEFECTS IN SCANNED IMAGES

FIELD

The present application relates to a calibration method for removing show-through defects in scanned document images.

BACKGROUND OF THE INVENTION

Presently, many document scanners and digital copiers are calibrated using the following calibration strategy, $y_i = m_i x_i + b_i$. For every i pixels there is a gain factor ($m_i$) and offset factor ($b_i$) applied to the image sensor response ($x_i$) to obtain the desired image sensor response ($y_i$). The image sensor response and desired image sensor response can be in voltage or A/D output levels, depending on whether the system calibration is done in analog or digital circuitry. The values of $b_i$ are set so that all pixels give the same desired minimum value of y with no light signal, and $m_i$ values are set so that all pixels give the same maximum value of y with the maximum possible light signal. These values can be determined with a calibration scan to a reference white strip and a dark (no light) capture. The values of $m_i$ and $b_i$ are stored in memory and used during real-time correction of image sensor output.

Figure 1:
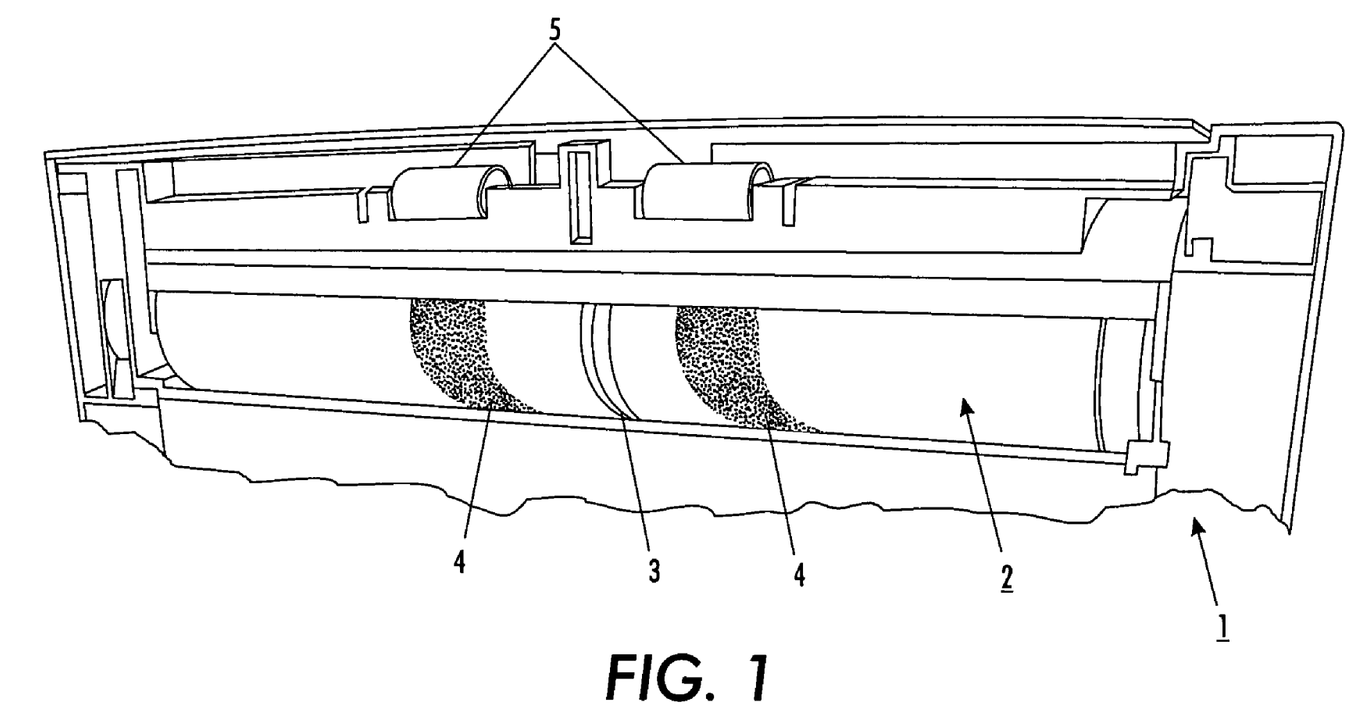
FIG. 1 shows a typical scanner having a document drive roll with a drive roll gap and drive roll contamination.

FIG. 1 shows the internal parts of a typical document handler 1 for a document scanner in a digital copier having a controlled velocity transport (CVT) roll 2. The roll 2 has a gap 3 in it to allow space for paper position sensors (not shown). This gap 3 presents a non-uniform background for documents and the potential for variation in scanner response for lightweight originals, translucent and/or transparent with high document show-through. Another potential non-uniform background area is drive roll contamination 4, e.g., toner or paper dust, at the locations of contact with the idler rolls 5 or at other locations on the roll 2.

The above calibration strategy does not compensate for the non-uniform background. Therefore, for light weight originals and/or for certain machine setups (copy darker/document type), the signature of the drive roll gap may be captured by the scanner and may create an objectionable band down the center of the resulting document's printed copy.

Figure 2:
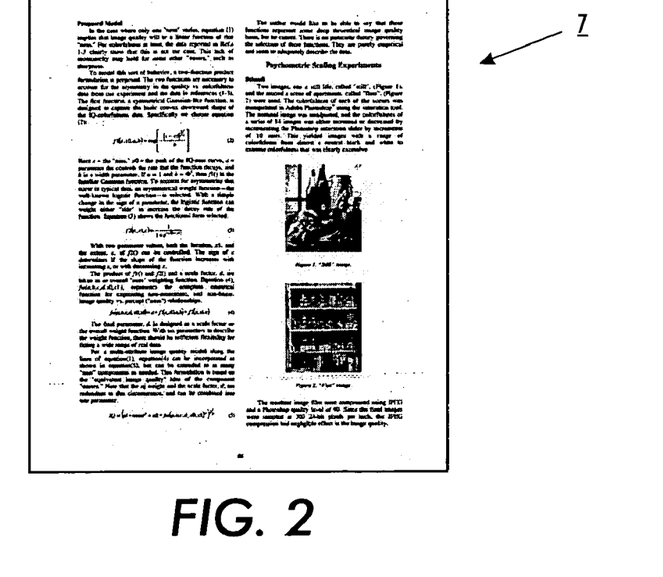
FIG. 2 shows an original document to be scanned, for example, by the scanner of FIG. 1.
Figure 3:
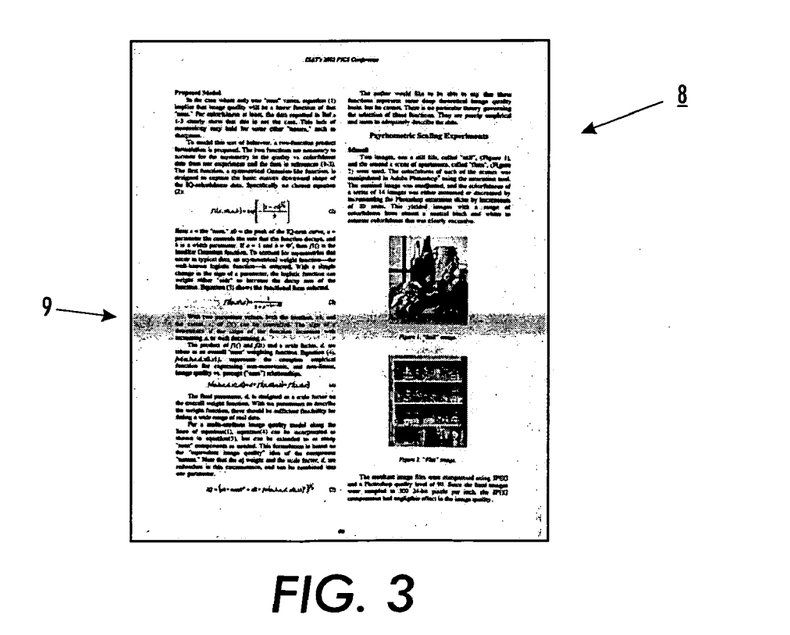
FIG. 3 shows a scanned copy of the original document of FIG. 2 with the defect.

FIG. 2 show an original document 7 to be scanned. The drive roll 2 is white and provides a uniform background to documents that may be somewhat translucent. The gap 3 in the drive roll 2 causes the background characteristics to be darker in this region. In this gap region, the background is essentially black. Therefore, there exists a discontinuity of backing reflectance, going from the white roll to the dark gap area. The dark gap area 'show-through' is imaged by the scanner and appears darker than the real document. This results in the streak-like gap defect 9 on the resulting scanned copy 8, as shown in FIG. 3. The machine image processing, in most cases, will mask this problem, through the use of a Tone Reproduction Curve which suppresses the highlight details. However, this is not a robust solution as it fails under certain use conditions typically with light weight and translucent originals (user interface (UI) selections) and produces darker images, which may bring out the darkness of the gap. It may also occur when the user changes the settings.

Figure 4:
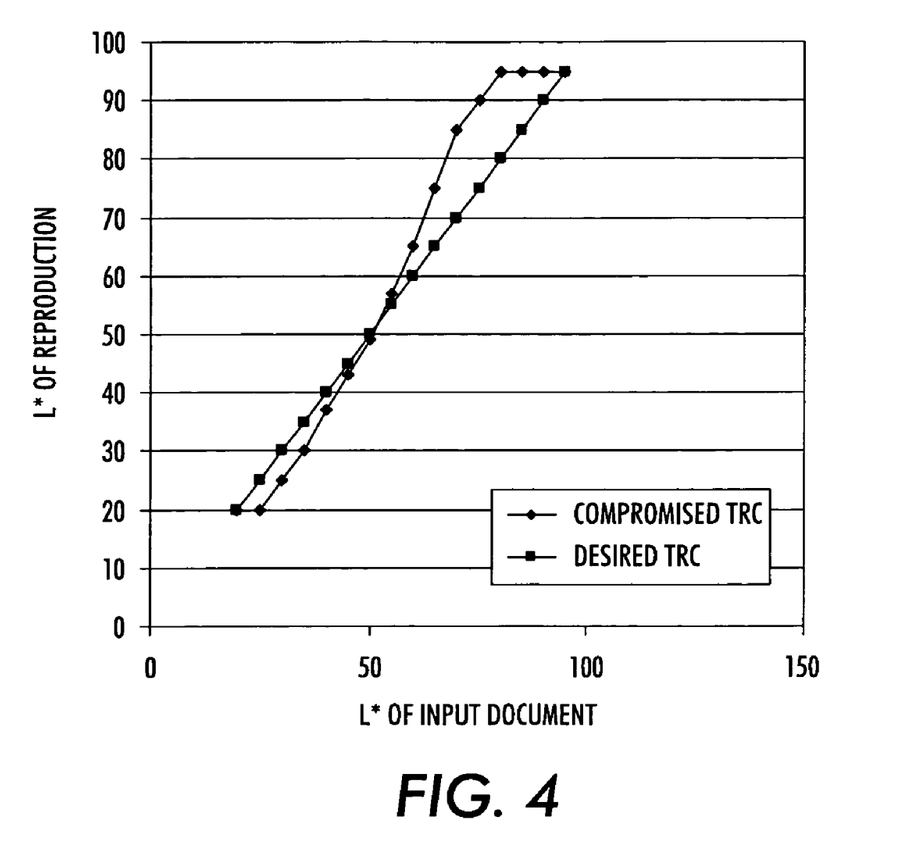
FIG. 4 shows tone reproduction curves for a typical scanner.

FIG. 4 illustrates the Tone Reproduction Curve (TRC) response profiles for the current-compromised system TRC and the desired system TRC for a typical scanner. In general, the default settings for the tonal reproduction of the digital copier system have been optimized to eliminate the 'show-through' problem. This is accomplished by designing the TRC, such that it suppresses the highlight details for high L* values. Any light shades of gray or high luminance colors will not be reproduced because they are eliminated from the printed image by the image processing system. Therefore, the default settings do not provide a faithful reproduction of the original document reflectance. In order to restore these missing details, the user must select a different setting (UI adjustment) until the light gray or color information is restored. However, in doing so, they may also encounter the presence of the show-through of the gap in the CVT backing rolls, depending on the transmission characteristics of the input document substrate.

Other alternative solutions, such as changing the color of the drive roll from white to gray, have been considered but do not eliminate the problem completely. This approach still has a differential backing reflectance; gray on the roll and black in the gap. This approach introduces a new artifact in the reproduction of the gray backing in areas where the document substrate is missing. This includes 3-hole punched paper, torn corners, or mis-registration due to mechanical variations.

Thus, there is a need for an improved method for removing show-through defects in scanned images.

SUMMARY

A method for removing show-through defects in document images scanned against background having a dark region is provided, comprising: identifying pixels affected by said dark region; measuring radiant energy transmitted though the document; calculating a dark region gain factor for each pixel as a function of radiant energy transmitted though the document; and correcting pixel gain for the affected pixels by said dark region gain factor.

A device for removing show-through defects in document images scanned against background having a dark region is provided, comprising, a device for identifying pixels affected by said dark region; a sensor for measuring radiant energy transmitted through the document; a device for calculating a dark region gain factor as a function of the radiant energy transmitted through the document; and a device for correcting pixel gain for the affected pixels by said dark region gain factor.

Other objects, features, and advantages of one or more embodiments of the present invention will seem apparent from the following detailed description, the accompanying drawings, and the appended claims.

BRIEF DESCRIPTION OF THE DRAWINGS

Embodiments of the present invention will now be disclosed, by way of example only, with reference to the accompanying schematic drawings in which corresponding reference symbols indicate corresponding parts, in which.

DETAILED DESCRIPTION

In a further improvement to the conventional calibration scheme, discussed above, the improved gap adjusted calibration utilizes the following calibration scheme, $$y_i = g_i m_i x_i + b_i \quad (1)$$

where $g_i$ is the gap gain factor adjustment (also referred to as a dark region gap factor for reasons discussed below) applied to each and every pixel (i=1 to n) on a job or per page basis (if calibration is done that frequently). The gap gain factor is unity (no adjustment) for pixels in the areas where the drive roll is white and uniform. For the pixels in the gap areas the gain is adjusted to compensate for various input document transmission by the ratio of the white roll gain to the gap gain to compensate for the effect the gap has on the reflected image.

The gap gain factor $g_i$ for the gap pixels (i.e., the pixels in the area of the gap) is determined by measuring the light transmission through the input document. Using Beer's law and other optical properties the reflected radiant energy from the input document, with consideration of the backing material's affect can be described as $$I_{reflected} = I_o R_p + (1 - R_p) I_o [R_{Backing} e^{-2kcx}] \quad (2)$$

where
$I_o$ is the incident energy
$R_p$ is the input document reflectance
$R_{Backing}$ is the backing reflectance
x is the thickness of the paper
k is the extinction coefficient
c is the concentration of the absorbing species in the input document The first term in equation (2) is the front surface reflection from the input document; the second is the reflection off the far input document surface and is dependent upon the backing reflectance. The input document properties (x, k, c) are typically experimentally determined, and the term $e^{-kcx}$, is replaced with T. The document transmission sensor of the scanner is used as an instrument to measure the light transmitted through each input document sheet (i.e., transmittance). Thus, equation (2) becomes $$I_{white} = I_o R_p + (1 - R_p) I_o [R_{Backing} T^2] \quad (3)$$

Figure 5:
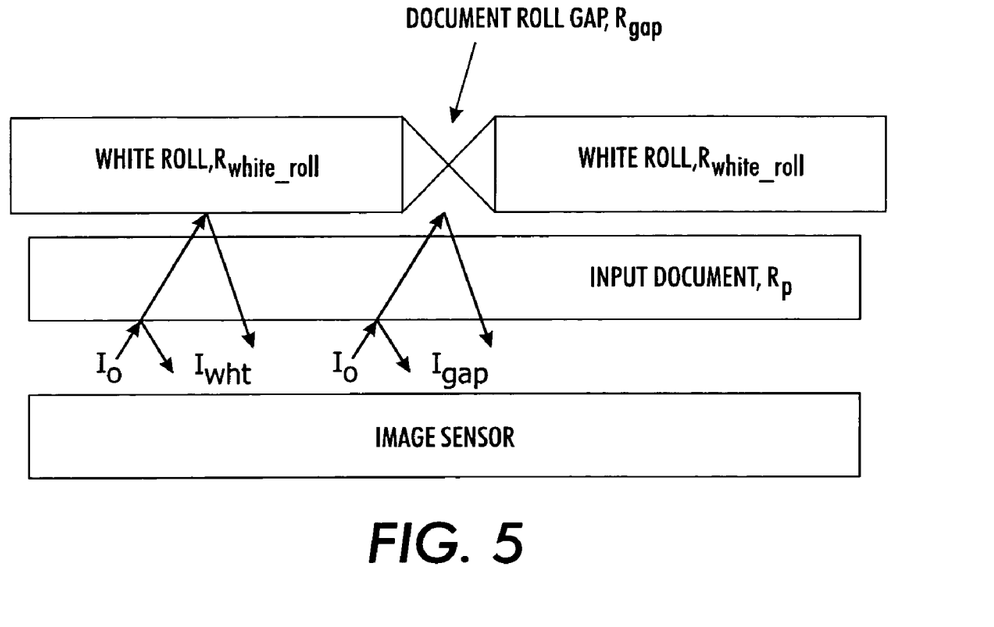
FIG. 5 is a diagram showing the system elements in accordance with the present invention.

Referring to FIG. 5, the gap gain factor can be determined by defining equations for the white roll backing (equation (4a)), and the gap (equation (5a)) and reducing these equations with data from the transmission sensor.

$$I_{white} = I_o R_p + (1 - R_p) I_o [R_{white\_roll} T^2] \quad (4a)$$

$$I_{gap} = I_o R_p + (1 - R_p) I_o [R_{gap} T^2] \quad (5a)$$

The ratio of $I_{white}/I_{gap}$ is equivalent to the gap gain factor, $g_i$, referenced in equation (1).

Assuming $R_{white\_roll}$ is approximately 80% and $R_{gap}$ is 0% (these numbers are assumed and may vary from machine to machine), equations (4a) and (5a) reduce to $$I_{white} = I_o R_p + (1 - R_p) I_o [0.8 T^2] \quad (4b)$$

$$I_{gap} = I_o R_p \quad (5b)$$

Further the ratio $I_{white}/I_{gap} = [I_o R_p + (1 - R_p) I_o [0.8 T^2]] / I_o R_p = 1 + 0.8 T^2 / R_p - 0.8 T^2$ In a first embodiment of the invention, the scanner could utilize a dual function sensor which not only measures transmission but also reflection of the input document, thus determining $R_p$ more exactly. Thus, $I_{white}/I_{gap}$ as determined above would be:

$$g_i = I_{white}/I_{gap} = 1 + 0.8 T^2 / R_p - 0.8 T^2 \quad (6)$$

In a second embodiment of the invention, $R_{white\_roll}$ is known by design and $R_p$ could be approximated to encompass the main machine demographic inputs. To the first order, $R_p$ is approximately 80% (this number is assumed and may vary from machine to machine). Thus, $I_{white}/I_{gap}$ reduces further to:

$$g_i = I_{white}/I_{gap} = 1 + 0.2 T^2 \quad (7)$$

Figure 6:
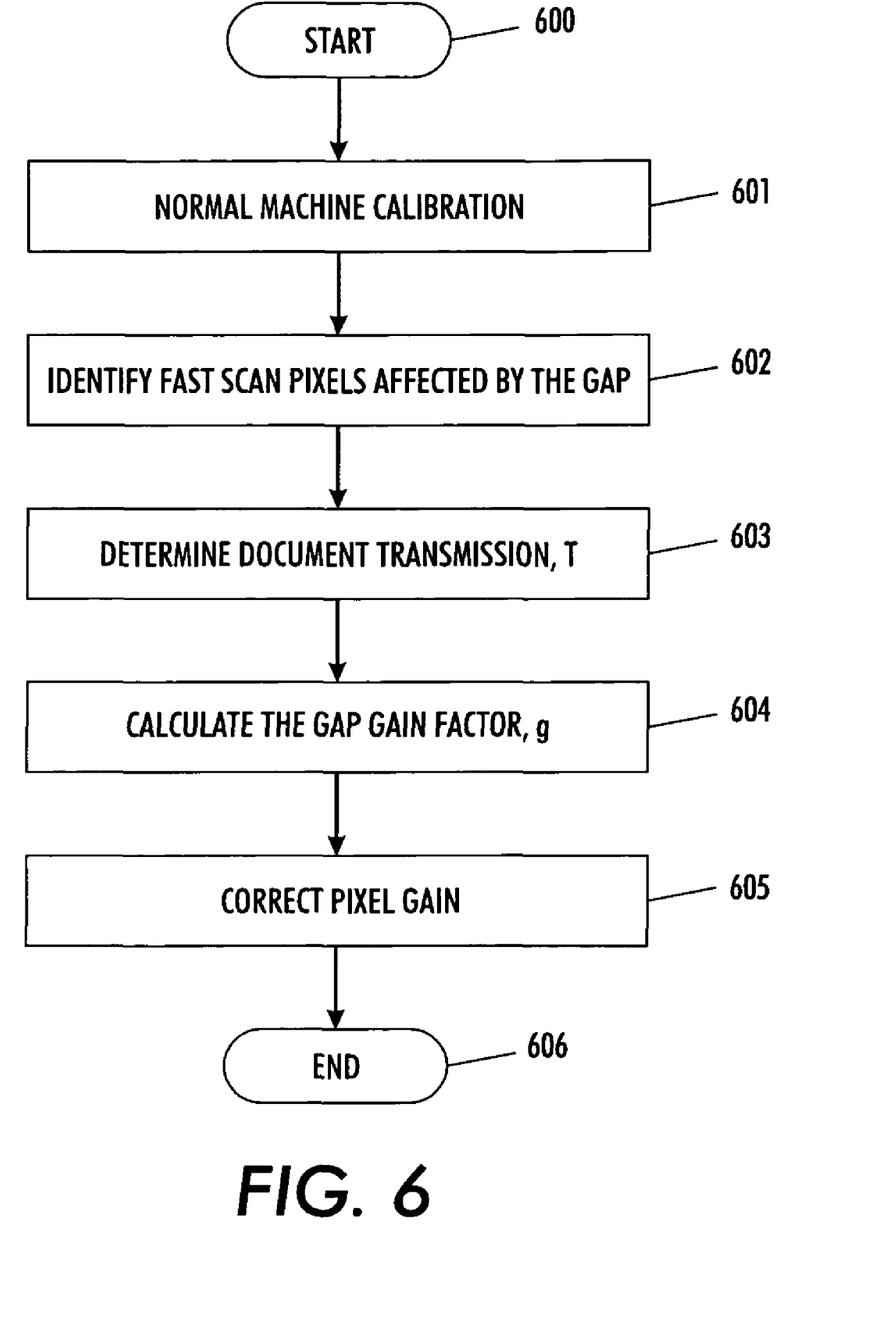
FIG. 6 is a block diagram of a method in accordance with the present invention.

To compensate for roll gap show-through defect, the following method, as depicted in FIG. 6, may be used.

Beginning at step 600, normal machine calibration is performed on the scanner in step 601 in the usual manner. The image sensor response $x_i$ can be in voltage or A/D output levels, depending on whether the system calibration is done in analog or digital circuitry. The values of $b_i$ are set so that all pixels give the same desired minimum value of y with no light signal, and $m_i$ values are set so that all pixels give the same maximum value of y with the maximum possible light signal. These values can be determined with a calibration scan to a reference white strip and a dark (no light) capture. The values of $m_i$ and $b_i$ are stored in memory and later used during pixel gain correction of step 605.

Figure 7:
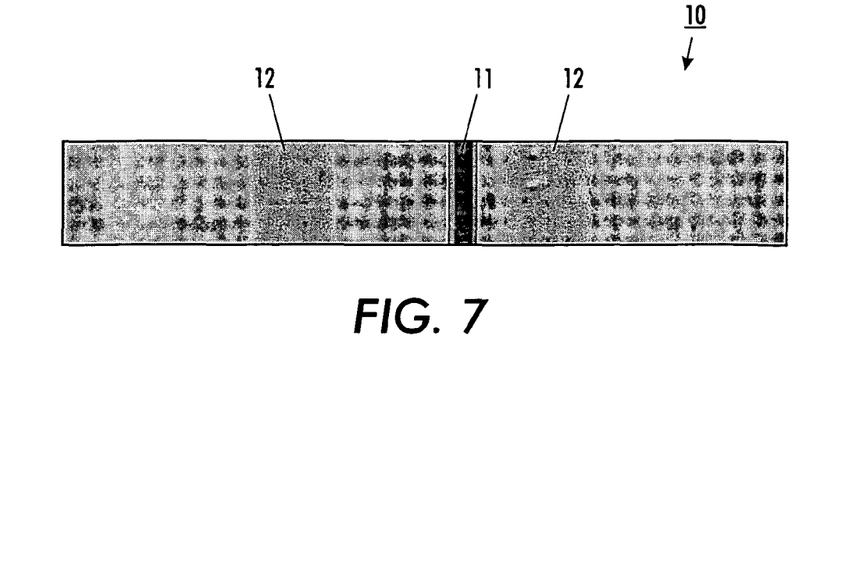
FIG. 7 shows an image sample of the drive roll from a setup scan in accordance with the present invention.
Figure 8:
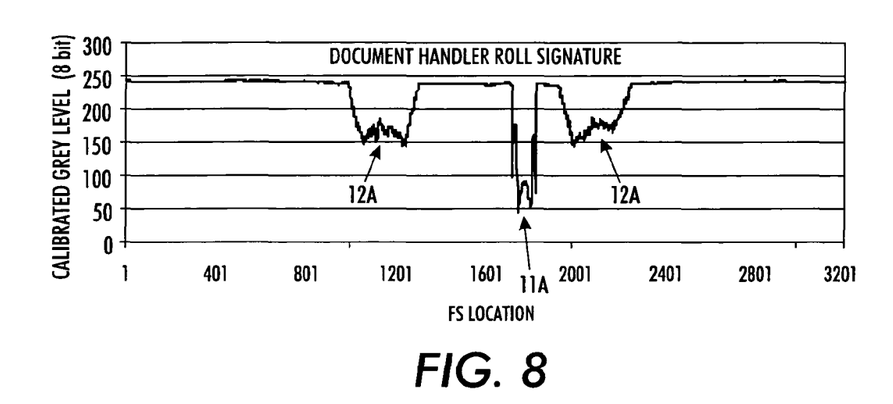
FIG. 8 shows the uncorrected, original calibrated response data of the drive roll verses Fast Scan location (FS Location) from the setup scan of FIG. 7 in accordance with the present invention.

Subsequently, in step 602 fast scan pixels affected by the gap are identified. FIG. 7 shows the image sample 10 of the drive roll from a setup scan and shows the profile of the roll (averaged scanlines in slow scan direction). Starting values for the gap affected, fast scan pixels would be based upon original design parameters. To take into account specific machine tolerances and part assembly, a more precise, in situ determination is made by a setup scan of the white roll during machine initialization. This scan is analyzed to identify those pixels that are clearly darker because of the gap 11 and/or contamination 12. FIG. 8 shows the response data of the drive roll from the setup scan shown in FIG. 7 after normal scanner calibration. FIG. 8 also shows the gap signature 11a, clearly identified, as well as other dirt/contamination signatures 12a (this example from a machine with some use). In a new machine the dirt contamination would typically be zero.

Figure 10:
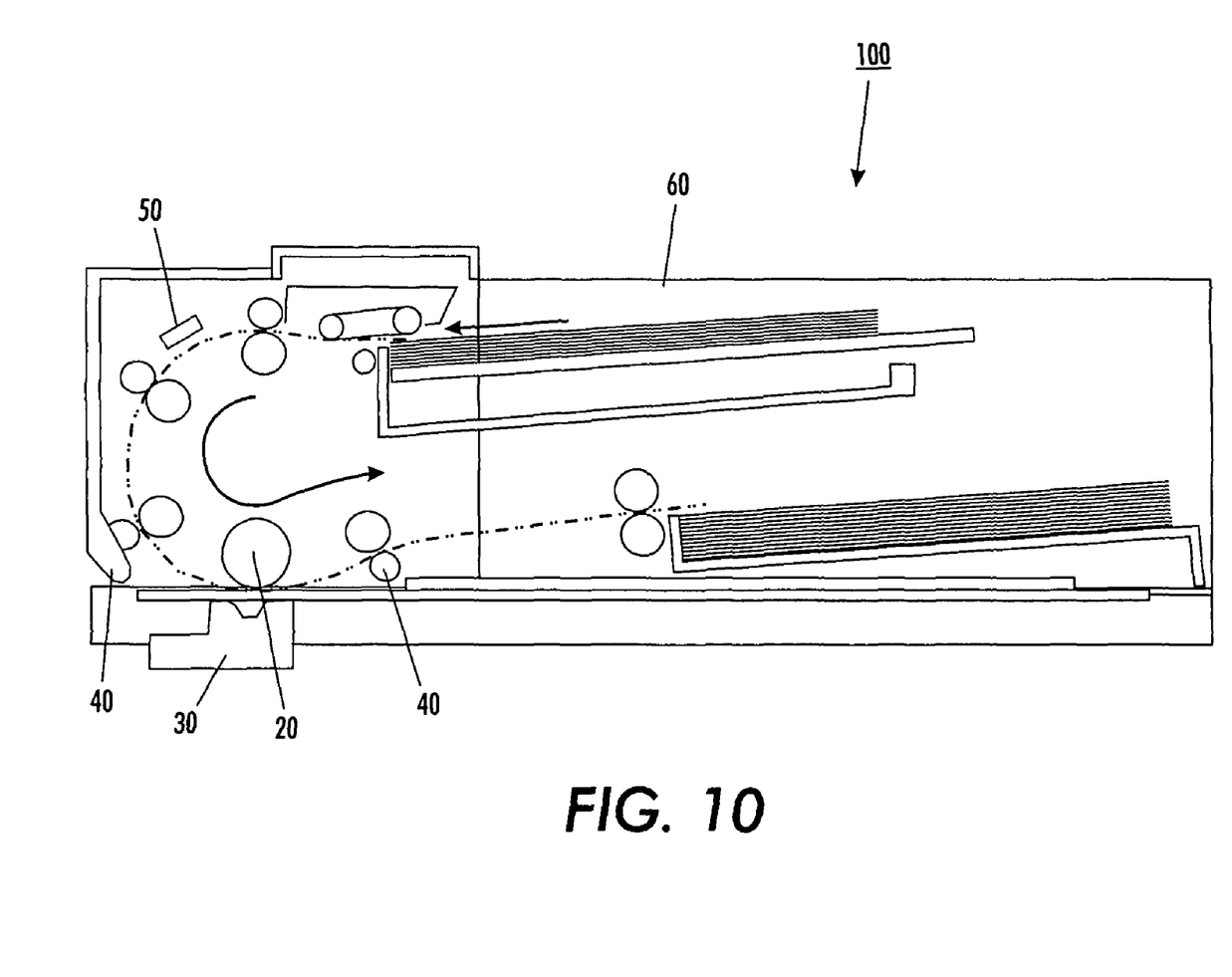
FIG. 10 shows a device in accordance with the present invention.

Continuing onto step 603, the document transmission T is determined. A transmission sensor (for example, as shown in FIG. 10) may be provided to measure the radiant energy transmitted through the input document. The sensor calibrates the gap gain magnitude for different input document opacities. Higher values are output for highly translucent, low opacity, lightweight documents more susceptible to the 'show through' defect. Low values are output for low transmission documents having highly opaque characteristics. The transmission sensor calibration would depend upon the device specifics and could be scaled to meet the criteria described above.

Next, in step 604, the gap gain factor g is determined. Using outputs from the transmission sensor determines the transmission of the paper and thus the gap gain factor $g_i$, can be calculated for each pixel according to equation (6) if the reflectance $R_p$ of the input document is measured; or equation (7) if the reflectance $R_p$ of the input document is approximated.

Figure 9:
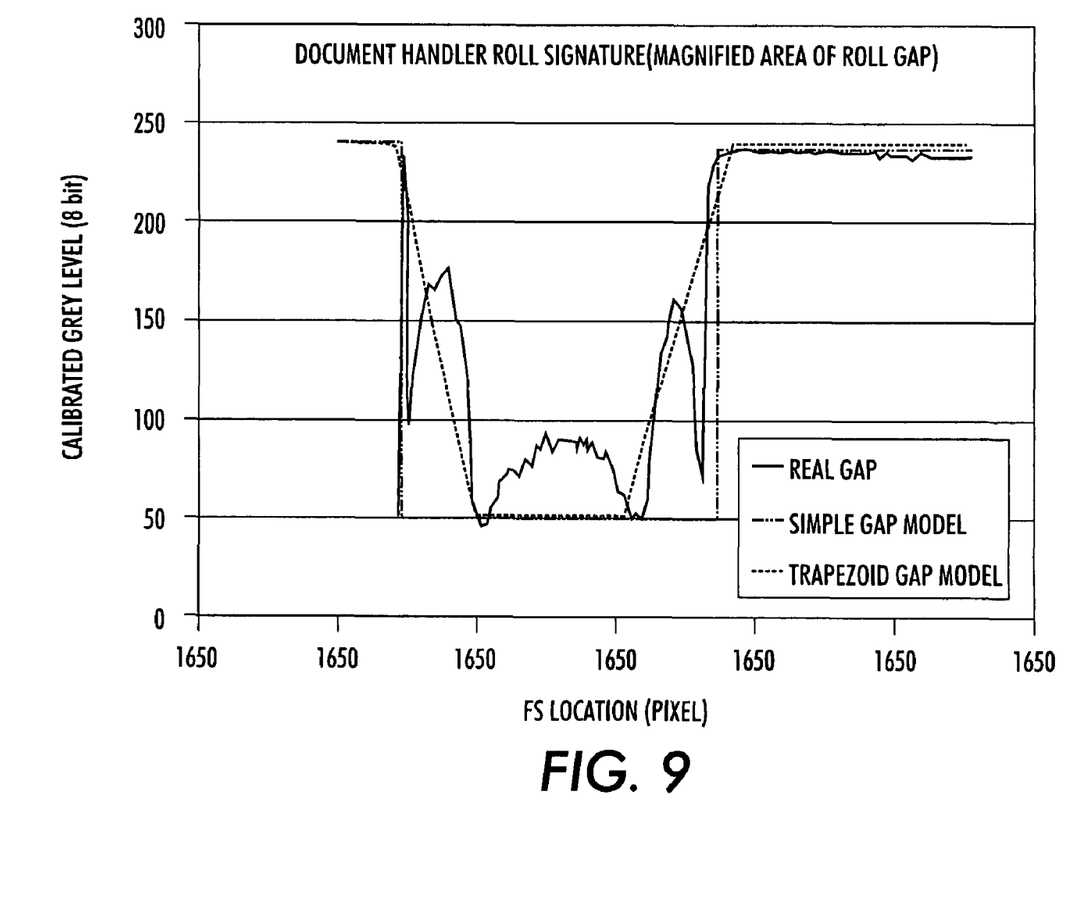
FIG. 9 shows the magnified gap signature of FIG. 8 in accordance with the present invention.

FIG. 9 shows the roll signature corresponding the magnified area of the roll gap 11a of FIG. 8. In one embodiment, a 'simple gap' model curve may be used to approximate the roll gap area. It has very sharp (less than 1 pixel wide) transitions between white response and the gap response. The 'real gap' curve on the other hand shows a real response that is dependent upon how the incident energy is reflected by the mechanical components of the gap, transmitted through the document and received by the image sensor. In a preferred embodiment, the invention may use an interpolating algorithm to correct for that type of gap signature quite successfully. FIG. 9 also shows a 'trapezoid gap' model that is a better fit to solve the problem than the 'simple gap' model. The pixels at the edge of the gap may be identified as requiring an interpolated gap gain adjustment since a profile of gap will transition from a stable light level to a darker level. However, it will be appreciated that various types of interpolating algorithms (e.g., linear, spline, polynomial) to more accurately approximate the gap gain factor in transitional regions are envisioned.

In step 605, the desired image sensor response $y_i$ is corrected to compensate for those pixels affected by the gap identified in step 602 according to equation (1).

Finally, the method ends at step 606.

This method could be applied on a job by job or possibly a document by document (i.e., a page by page) basis for more accurate results.

A further embodiment of the setup procedure would be to scan a blank white input document to understand the input document's spreading of light in the document handler.

As the system ages, a diagnostic procedure could be defined which would apply the correction to a white, blank input document. A 'fast scan' profile of the blank document may be calculated and evaluated for its uniformity. If the resulting analysis shows the profile to have excessive errors across a large number of blank input documents, then two different alternatives could be applied: 1) The gain compensation routine could be repeated; or 2) an additional correction factor adjustment could be applied to the gain factor approach.

This invention could also be used to compensate for contamination with toner or paper dust on the roll. The contamination 4 on the area opposite the gap 3 of the drive roll 2 is somewhat darker and could potentially over time create a 'dirty roller signature,' as shown in FIGS. 6 & 7. Thus, in a broad sense the method described herein may be used for any darker region and not just one created by a gap. As such, the term "gap gain factor" used herein may be broadly referred to as a "dark region gain factor."

The invention could also incorporate a slow scan position correction for platen or roll background variations (i.e., if the platen cover has non-uniform areas causing background signatures in platen scanned originals.

The method can be practiced with both new or existing devices, such as digital copiers, scanners, xerographic systems, or the like. FIG. 10 shows a scanner device 100, in accordance with one embodiment of the invention, having a drive roll 20, image sensor 30, and idler rolls 40. These features are found conventionally in the art. (see FIG. 1). The scanner device's drive roll 20, may have a gap in it (similar to the one shown in FIG. 1) to allow space for paper position sensors (not shown). The device will also include a document transmission sensor 50 for measuring document transmission of an input document 60. Those skilled in the art will appreciate a point sensor 50 could be located for example as shown in FIG. 10 or could be a dual function sensor which measures both transmission T and reflectance $R_p$ of the input document 60 located in the scanner 100. The various calculations discussed above can be coded inside the device hardware, e.g., a microprocessor. In other embodiments these calculations can also be performed in the real time control/image processing computer and/or related software.

While the specific embodiment of the present invention have been described above, it will be appreciated that the invention may be practiced otherwise than described. The description is not intended to limit the invention.

What is claimed is:

1. A method for removing show-through defects in document images scanned against background having a dark region, comprising:
   (a) identifying pixels affected by said dark region;
   (b) measuring radiant energy transmitted though the document;
   (c) calculating a dark region gain factor for each pixel as a function of radiant energy transmitted though the document; and
   (d) correcting pixel gain for the affected pixels by said dark region gain factor.

2. The method of claim 1, wherein step (a) is performed by a setup scan of the roll during scanner initialization.

3. The method of claim 1, wherein step (a) is performed by identifying pixels that will be substantially darker because of said dark region.

4. The method of claim 1, wherein step (b) is performed by a sensor measuring the radiant energy transmitted through the document.

5. The method of claim 1, wherein step (c) is performed as follows:

$g = 1 + c\, T^2$, where g is the dark region dark factor, c is a constant depending upon document transmission, and T is the measured radiant energy transmitted through the document.

6. The method of claim 1, wherein step (c) further comprises identifying pixels at the edge of the dark region and interpolating the dark region gain factor.

7. The method of claim 1, wherein said step (d) further comprises calculating a desired image sensor response (y) for each pixel (i), as follow:

$$y_i = g_i * m_i * x_i + b_i$$

where $g_i$ is the dark region gap factor
   $m_i$ is a gain factor
   $b_i$ is an offset factor
   $x_i$ is an image sensor response.

8. The method of claim 1, wherein the background is a surface of a document transport roller, and wherein the dark region of the background is a gap in the surface of the roller.

9. The method of claim 1, wherein background is a surface of a document transport roller, and wherein the dark region of the background is contamination factors.

10. The method of claim 1, further comprising measuring the input document reflectance ($R_p$).

11. The method of claim 10, wherein step (c) is performed as follows:

$$g = 1 + c_1 T^2 / R_p - c_2 T^2,$$

where g is the dark region dark factor, $c_1$ and $c_2$ are constants depending upon document transmission, and T is the measured radiant energy transmitted through the document.

12. A system for removing show-through defects in document images scanned against a background having a dark region comprising:
(a) a device for identifying pixels affected by said dark region;
(b) a sensor for measuring radiant energy transmitted through the document (T);
(c) a device for calculating a dark region gain factor as a function of the radiant energy transmitted through the document; and
(d) a device for correcting pixel gain for the affected pixels by said dark region gain factor.

13. The system of claim 12, wherein said sensor is a transmittance sensor.

14. The system of claim 12, wherein said sensor is a dual function sensor which measures both transmission and reflectance of said document.

15. The system of claim 12, further comprising a sensor for measuring the reflectance ($R_p$) of said document.

16. The system of claim 12, wherein said system is part of a xerographic system.

* * * * *